UNITED STATES PATENT OFFICE.

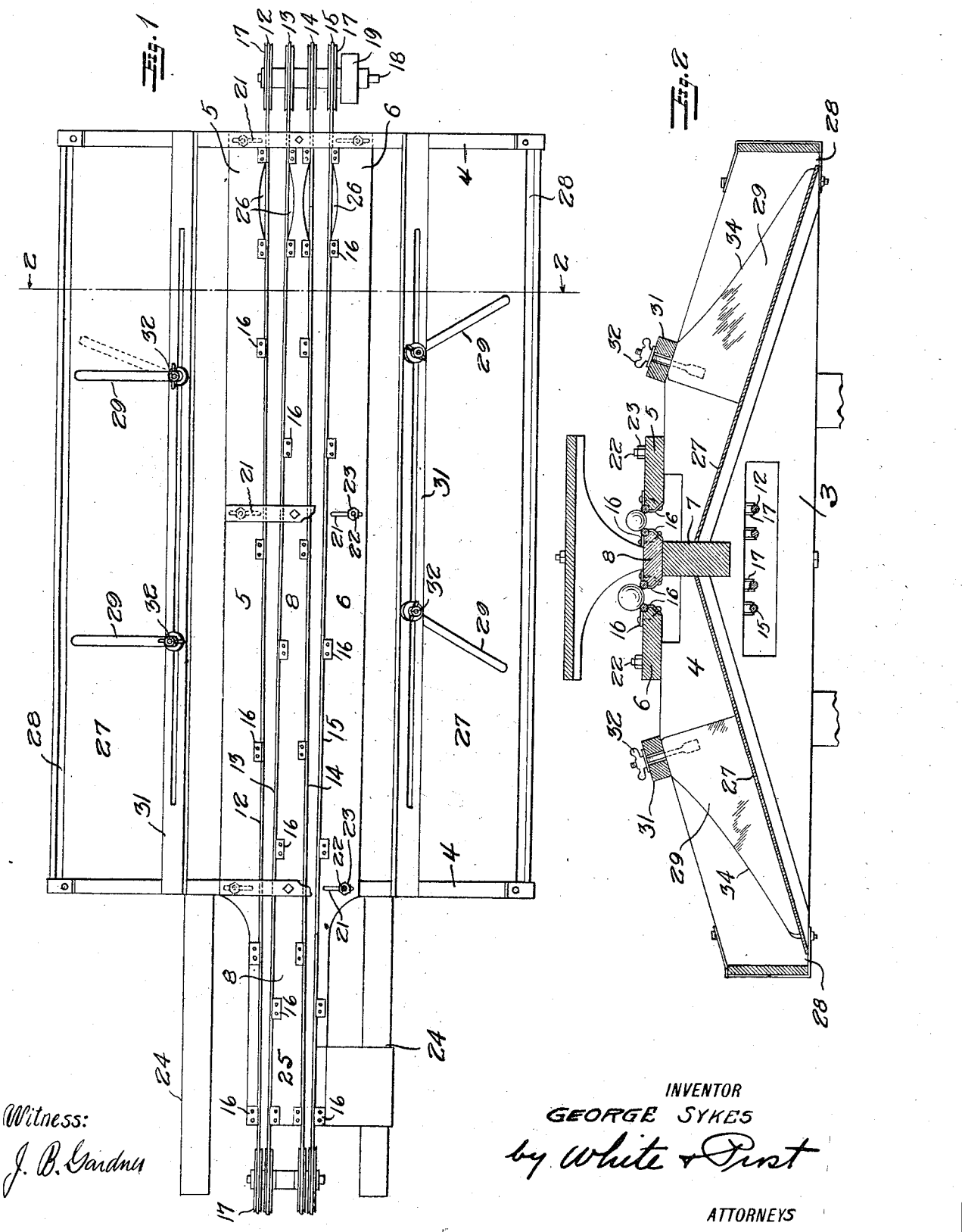

GEORGE SYKES, OF PENRYN, CALIFORNIA.

SIZING APPARATUS.

1,295,812.      Specification of Letters Patent.      Patented Feb. 25, 1919.

Application filed November 19, 1917. Serial No. 202,694.

*To all whom it may concern:*

Be it known that I, GEORGE SYKES, a citizen of the United States, and a resident of Penryn, Placer county, State of California, have invented a certain new and useful Sizing Apparatus, of which the following is a specification.

The invention relates to apparatus for grading fruit in accordance with its size.

An object of the invention is to provide a sizing apparatus which is adjustable to distribute the predominating size of fruit over varying areas.

Another object of the invention is to provide a small sizing apparatus which is adjustable to accommodate different predominating sizes of fruit.

Another object of the invention is to provide means for concentrating at one point all fruit which is greater in size than the predominating size.

The invention possesses other advantageous features some of which, with the foregoing, will be set forth at length in the following description where I shall outline in full, that form of the invention which I have selected for illustration in the drawings accompanying and forming part of the present specification. In said drawings I have shown one specific form of the apparatus of my invention, but it is to be understood that the invention, as expressed in the claims, may be embodied in a plurality of forms.

Referring to said drawings:

Figure 1 is a plan or top view of the apparatus of my invention, part thereof being broken away to disclose the construction.

Fig. 2 is a cross section of the apparatus taken on the line 2—2, Fig. 1.

The apparatus of my invention is much shorter than the various forms of sizing machines heretofore generally used, and is adapted to be adjusted to grade fruit of different sizes, the adjustment being made to secure the sizing of the predominating size of fruit. Any fruit, such as apples, for instance, occurs in many different sizes, but as a general rule, as the fruit is brought in to the packing house from the orchard, it will be found that most of the fruit will be of approximately the same size, with some running smaller and a few larger. The sizes of the pieces of fruit in the predominating group vary and it is an object of this apparatus to grade the fruit which occurs in the predominating group. Fruit from different orchards or from different parts of the same orchard varies in size, so that the range of sizes occupied by the predominating group varies and the present apparatus is adjustable to accommodate the various predominating group sizes. For instance, the great majority of the fruit may vary from 3 inches to $3\frac{1}{2}$ inches in diameter the sizer may be adjusted to divide this fruit into three groups of 3, $3\frac{1}{4}$ and $3\frac{1}{2}$ inch size. All fruit of smaller size is not graded and all fruit of larger size is collected together and may be subsequently sized by varying the adjustment of the apparatus.

The apparatus comprises a suitable frame 3 upon which are mounted the cross members 4. Mounted on the cross members and extending for the length of the frame are the outside conveyer guides 5—6 and secured to the cross members 4 and extending for the length of the frame is the stringer 7 upon which is secured the central conveyer guide 8. The upper surfaces of the conveyer guides lie in a horizontal plane and the inner edges of the outer guides are spaced from the outer edges of the inner guide, forming a slot between each outer guide and the inner guide. At the upper edges of their adjacent surfaces the guides are provided with longitudinal grooves which serve as seats for the conveyer ropes 12, 13, 14, 15. The ropes are preferably held in their seats by clamping plates 16 secured to the guides at intervals and having beveled edges overlying the ropes. The ropes extend for the length of the guides and at the ends pass over the sheaves 17 and back through the frame below the guides. The sheaves 17 are secured to the drive shaft 18 which is rotated in any desirable manner, as by the pulley 19, to cause the ropes to travel longitudinally in their seats. The pieces of fruit to be sized are placed on either pair of ropes 12—13 or 14—15 and are conveyed by the traveling ropes along the apparatus. The adjacent edges of the rope guides, and consequently the ropes of each pair, diverge from each other in the direction of their travel, and the rope guides are so arranged that the pieces of fruit of the predominating sizes will fall through the increasing space between the two ropes as they are carried along.

The outer rope guides 5 and 6 are adjustably mounted on the frame 3 so that they may be moved transversely, either to vary their angle with respect to the central rope guide 8 or to vary the distance between the pair of ropes forming a conveyer unit. The guides are provided with transverse slots 21 through which extend the bolts 22 which are secured in the frame. By loosening the nuts 23 on the upper ends of the bolts, the outer guides may be readily moved to adjusted positions and clamped in such positions by tightening the bolts.

Arranged on opposite sides of the head end of the apparatus are supports 24 for the boxes or baskets of fruit to be sized, and the operators stand adjacent the head end extension 25 and place the fruit on the ropes in that position in which it is desirable to size it. At the tail end of the apparatus the rope guides are depressed or cut away at 26 to form an enlarged opening between the adjacent surfaces of the guides. The ropes passing these cut away portions are unsupported so that they are spread by the fruit thereon and the large-sized pieces of fruit permitted to fall through.

Arranged under each conveyer is a trough having an inclined floor 27, the upper portion of the floor occurring under the conveyer and being spaced therefrom a suitable distance to permit the larger sizes of fruit to roll under the outer guides. The floor is preferably covered with linoleum or similar material and is preferably waxed so that it presents a smooth surface to the surface of the fruit, thereby preventing damage to the fruit. At its lower outer end, the trough is provided with a narrow slot 28, through which any dirt or leaves may pass.

The trough is divided into a plurality of bins by the walls 29, which are both angularly and longitudinally adjustable to vary the size of the bin or the size of its intake and discharge ends. Secured to the frame 3 and extending for the length of the apparatus is a slotted bar 31 and a bolt secured to the dividing wall 29 extends through the slot and is clamped to the bar by the nut 32. When the fruit runs almost all to one size, the greater portion of the fruit will drop through the conveyer at one point and collect in one bin. The packers stand at the edge of the bin and when the fruit runs to one size it frequently deposits in the bin faster than the packers can remove it. The angularly adjustable dividing walls of my invention permit the length of the packing space to be greatly increased, without increasing the entrance size of the bin, thereby permitting a greater number of packers to work on one bin. By setting the boards at diverging angles a bin of increasing width outwardly is provided for accommodating the predominating-sized fruit. The upper edge 34 of the dividing wall slopes downward from the bar 31 to the edge of the bin, so that the wall can be readily swung while there is fruit in the bins, and this edge is preferably rounded so that the fruit may readily ride over the wall when the wall is swung.

Supported above the conveyers is a longitudinally extending table 35, upon which boxes or other articles may be placed.

I claim:

1. In a fruit sizing apparatus, a pair of associated normally stationary grooved guides diverging from each other and extending longitudinally for the length of the apparatus, means for adjusting the relation of said guides whereby the distance between them is varied, and ropes movable longitudinally in the grooves in said guides.

2. In a fruit sizing apparatus, a pair of associated rope guides having longitudinal seats along their edges for the reception of the ropes, said guides being depressed at adjacent parts whereby the ropes are unsupported at such parts.

3. In a fruit sizing apparatus, a pair of associated rope guides, ropes movable longitudinally on said guides, and each guide having a cut-away portion at which the rope is unsupported, said cut-away portions being arranged opposite each other.

4. In a fruit sizing apparatus, a conveyer from which fruit is discharged at different points in accordance with the size of the fruit, a trough arranged below the conveyer adapted to receive said fruit, and walls dividing the trough into a plurality of bins, said wall being adjustable to vary the length of the discharge side of a bin with relation to the intake side thereof.

5. In a fruit sizing apparatus, a conveyer from which fruit is discharged at different points in accordance with the size of the fruit, and a trough having an outwardly and downwardly inclined bottom arranged below the conveyer and adapted to receive the fruit therefrom, the bottom of said trough being provided with a narrow, longitudinal slot at its lower end.

6. In a fruit sizing apparatus, a conveyer from which fruit is discharged at different points in accordance with the size of the fruit, a trough arranged below said conveyer and angularly adjustable walls dividing the trough into bins.

7. In a fruit sizing apparatus, a conveyer from which fruit is discharged at different points in accordance with the size of the fruit, a trough arranged below said conveyer, longitudinally-movable walls dividing the trough into bins, and means for fixing said walls in angularly-adjusted positions.

8. In a fruit sizing apparatus, a conveyer from which fruit is discharged at different points in accordance with the size of the fruit, a trough arranged below said conveyer, a slotted bar extending longitudinally above said trough, a wall dividing the trough into compartments, and means adjustably securing said wall to said bar.

9. In a fruit sizing apparatus, a conveyer from which fruit is discharged at different points in accordance with the size of the fruit, a trough arranged below said conveyer and substantially triangular shaped angularly adjustable walls dividing the trough into bins, said walls decreasing in height outwardly and having rounded upper edges.

In testimony whereof, I have hereunto set my hand at San Francisco, California, this 31st day of October, 1917.

GEORGE SYKES.

In presence of—
H. G. Prost.